United States Patent [19]

Klupt

[11] Patent Number: 5,199,662
[45] Date of Patent: Apr. 6, 1993

[54] LIMITED USE COMBINED MAILER AND VIDEO CASSETTE AND METHOD OF FORMING SAME

[76] Inventor: Carle D. Klupt, 8218 Arrowhead Rd., Baltimore, Md. 21208

[21] Appl. No.: 921,382

[22] Filed: Jul. 30, 1992

Related U.S. Application Data

[63] Continuation of Ser. No. 701,368, May 13, 1991, abandoned, which is a continuation of Ser. No. 440,218, Nov. 22, 1989, abandoned.

[51] Int. Cl.$^5$ ............................................ G11B 23/087
[52] U.S. Cl. .................................................... 242/199
[58] Field of Search ................................ 242/197–200; 206/387; 229/141, 161, 921

[56] References Cited

U.S. PATENT DOCUMENTS

| | | | |
|---|---|---|---|
| 1,943,074 | 1/1934 | Heyman | 229/921 X |
| 4,433,780 | 2/1984 | Ellis | 229/921 X |
| 4,634,007 | 1/1987 | Rusnock | 206/634 X |
| 4,883,176 | 11/1989 | Hart et al. | 242/199 X |

Primary Examiner—John M. Jillions
Assistant Examiner—William G. Battista, Jr.
Attorney, Agent, or Firm—Morton J. Rosenberg; David I. Klein

[57] ABSTRACT

A disposable video cassette for rotatably mounting a pair of reels for a recording tape in juxtaposition to allow transfer of the tape from one reel to the other as they are rotated in unison when the cassette is operating in a video cassette recorder (VCR) has a housing formed from a position of a singly flat paperboard blank having plural cutouts and fold lines for mounting the reels and accommodating rotation therein, for loading the cassette directly into the VCR. A pair of the cutouts is spaced apart in one side of the housing to expose the respective rotational driving mechanisms of the pair of reels in the housing, for mating with the driving mechanism of the VCR when the cassette is loaded therein. Another position of the blank constitutes an appendage to the housing conforming to the shape of the housing when formed. The appendage has fold lines to enclose the housing therein, to provide an integral mailer for the cassette, and is attached to the housing along an easy-tear fold line to permit ready removal of the mailer when the cassette is to be used in a VCR. The mailer when detached becomes printed material, i.e. a coupon, educational material, pharmaceutical detail material, games, etc.

28 Claims, 2 Drawing Sheets

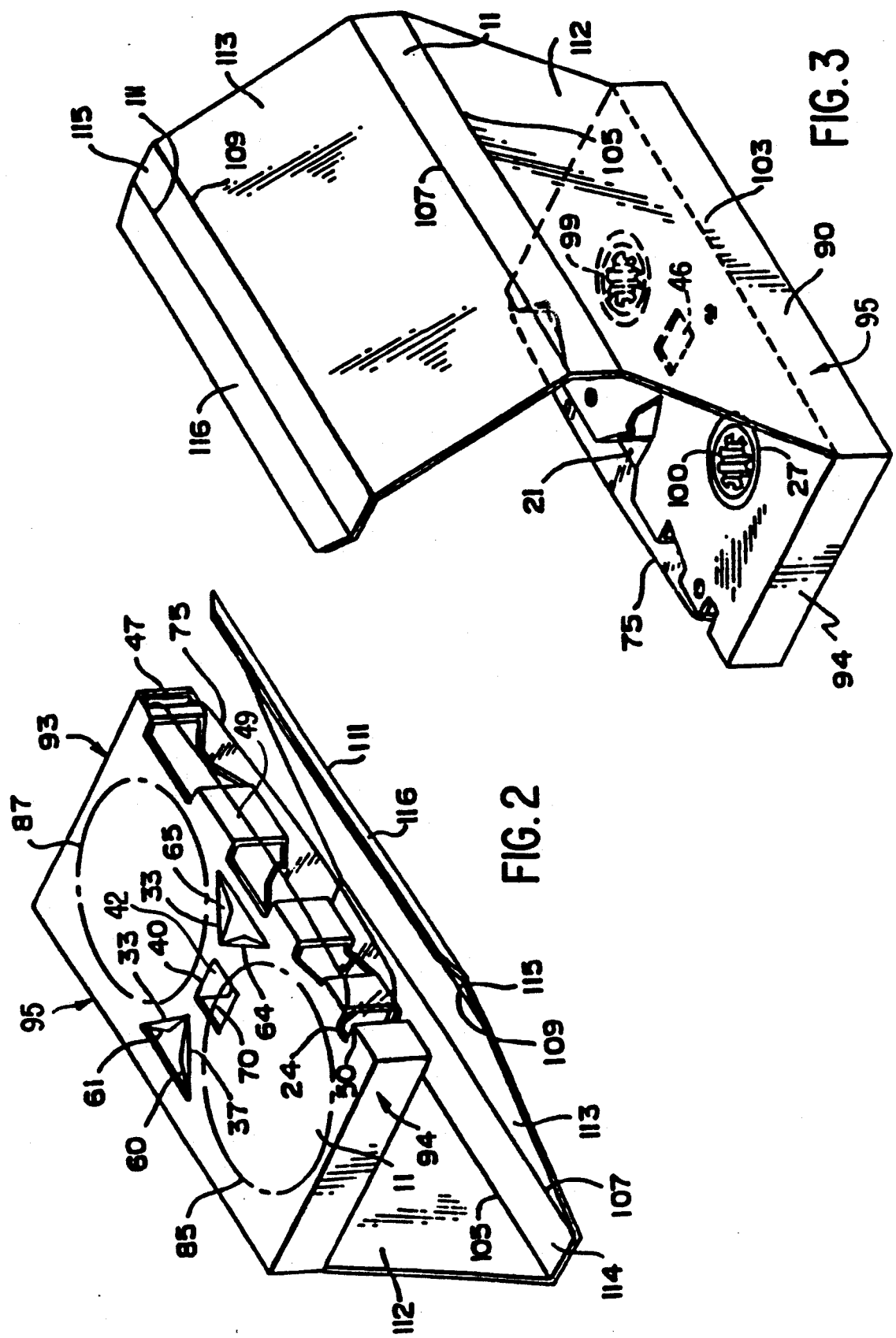

LIMITED USE COMBINED MAILER AND VIDEO CASSETTE AND METHOD OF FORMING SAME

CROSS-REFERENCE TO RELATED APPLICATIONS

This is a continuation of copending application Ser. No. 07/701,368 filed on May 13, 1991, now abandoned, which is a continuation of application Ser. No. 07/440,218 filed Nov. 22, 1989, now abandoned.

This application is related to a co-pending U.S. patent application of the same inventor, titled "Limited Use Video Cassette", filed Nov. 22, 1989 (the "co-pending application").

BACKGROUND OF THE INVENTION

The present invention relates generally to recording medium cartridges or cassettes. More particularly, the invention resides in a disposable video cassette composed of a one-piece blank for housing the recording tape reels and for loading directly into a video cassette recorder (VCR), and having an integral removable mailer.

As observed in the co-pending application, present-day video cassettes are generally composed of a rigid plastic case or housing. A pair of reels or spools on which a magnetic recording tape is wound are mounted side by side in the housing for rotation in unison on spaced capstans or spindles constituting part of the drive mechanism of a VCR. The tape is transferred from one reel to the other to move laterally adjacent the head(s) of the VCR for recording or playback. Where the tape is pre-recorded with only a short presentation, for the purpose of providing an advertising, sample, or preview presentation which may run only a few minutes in length, for demographic distribution, the cost of the plastic video cassette including the mailer and literature becomes expensive. Moreover, such short presentations are usually intended for only one or a few plays, not for repeated viewings.

The invention disclosed in the co-pending application provides a recording medium cassette, and specifically a video cassette primarily intended as a pre-recorded, brief advertising video, which is sufficiently inexpensive in materials and manufacture to render it disposable in normal use. According to that invention, the housing for the video cassette is formed entirely from a single piece of thin self-supporting foldable material such as cardboard or paperboard, i.e., a blank, which is foldable along preformed fold lines to enclose the pair of reels for the recording tape and to position them side-by-side for rotation between a pair of side panels of the paperboard housing. The paperboard blank has dimensions such that the housing developed therefrom is the size of a conventional video cassette (e.g., VHS, Beta or other standard size). The side panels are separated in parallel planes by the housing's end panels which have a width just sufficient to accommodate the reels for rotation. One of the side panels has cutouts to expose the internal drive mechanism of the reels, so that the cassette may be mounted on the mating drive mechanism of the VCR.

Also according to the invention disclosed in the co-pending application, the housing includes tabs formed by folding out slitted portions of one or both side panels, along preformed fold lines, to separate the reels from one another and to prevent them from shifting laterally, while enabling them to rotate freely within the paperboard housing. One of the end panels has cutouts for passage of the recording tape therethrough and against its external surface as the tape is wound and unwound on the reels. The external surface is coated with a material having a lower coefficient of friction than other portions of the surface of the paperboard housing, to reduce drag of the recording tape as it is transferred from one reel to the other.

The thickness of the paperboard blank, and the arrangement of the side and end panels together with tabs formed from slits therein, as well as the presence of the reels in the housing, render the developed cassette to be of sufficient rigidity to easily withstand normal handling. Yet, the weight of the paperboard housing when compared to that of a typical plastic cassette housing, makes the paperboard cassette considerably less costly to mail or to use other methods of shipment to the prospective end user. This represents another advantage of the latter cassette for use as a pre-recorded advertising or sample video, where economy is a principal consideration.

With the presence of exposed items which are essential to the operation of such a cassette, at the side and end panels of the housing, such as the drive mechanism for the reels, the recording tape overlying a specially coated end panel, and the tabs which separate the reels and retain them for rotation within the housing, it is imperative that the cassette be protected during storage, handling and shipment. Typically, prior art cassettes are inserted into plastic cases or cardboard holders for protection during shipment, distribution and handling. For mailing or other shipment to end users, it is necessary to employ yet another outer wrapping or enclosure for addressing. Each additional case, holder, enclosure or wrapping adds another level of cost to the manufacture and handling by the producer, and to the weight, and therefore the shipping costs, of the final product.

It is a principal object of the present invention to provide low-cost mailer for a video cassette.

It is another object of the present invention to provide an economical protecting enclosure which may be formed as part of a blank for a one-piece video cassette housing and to deliver printed material as part of the enclosure.

SUMMARY OF THE INVENTION

Briefly, according to the present invention, a low cost record cassette includes a housing which is formed entirely from a blank comprising a thin sheet of foldable, self-supporting material which is folded along preformed fold lines to enclose the record medium and the transport mechanism therefor. The blank includes an appendage of the same thin sheet material which is structured to form a protective wrapper or mailer for encompassing the housing and sealing thereto and to also provide a surface for advertising indicia. According to a further aspect of the invention, the appendage or mailer portion is adapted for ready manual removal from the housing after the cassette is received by the end user, by merely tearing it away along a perforated, scored, or thinner sectioned line of the sheet material at the point of its attachment to the housing. The mailer portion when detached becomes printed material, i.e. a coupon, educational material, pharmaceutical detail material, games, etc.

In a preferred embodiment of the invention, the record cassette is a video cassette corresponding to the embodiment disclosed in the co-pending application, in which the thin sheet of foldable material is paperboard, fashioned in a blank. Although the preferred self-supporting foldable material is paperboard, it should be understood that other thin blanks of self-supporting foldable material such as corrugated board, low density plastic such as polyethylene and other fiber products such as pressboard may be used. When folded, a portion of the blank forms a housing enclosing a pair of reels on which the recording tape is wound. The reels are thereby positioned side-by-side between a pair of side panels which are separated by end panels of the housing having a width just sufficient to accommodate the reels for rotation in the housing.

Unlike the invention disclosed in the co-pending application, however, here the end of the end panel which is opposite in the housing from the end panel at which the recording tape is exposed, is connected along a perforated line to an extended portion of the paperboard blank. This latter portion is of sufficient length and dimensions, and has fold lines, to allow it to be folded about the developed housing. In this manner, both side panels and the connecting end panel therebetween at which the recording tape is exposed are enclosed within a protective mailer which may then be sealed at the opposite end panel or, if desired, along an extended flap or lip against one of the mailer sides overlaying a side panel of the cassette housing.

Such a cassette is sufficiently economical to produce to make it attractive as a disposable, pre-recorded, brief video presentation which may be an advertisement, preview or sampler, solely to promote the sale of another product or a longer video presentation. It is also economically and efficiently distributed, with its built-in mailer, to prospects in a demographically selected group, in the same manner that printed advertisements are distributed in the mails. The recipient need only unseal the mailer, tear it away along the perforations, and the remaining self-contained video cassette is ready for viewing. The detached mailer portion which contains information relative to the taped material is retained by the recipient for informational use.

Therefore, another object of the present invention is to provide a video cassette having a paperboard housing to render it disposable in normal use, and in which the housing has an integral removable mailer, in the form of a built-in container for mailing the cassette and separable therefrom to allow recording and/or playback of the cassette.

It is a further object of the present invention to provide a record medium cassette housing which is formed from a thin one-piece sheet of material and is self-contained for loading directly in a record player, and which has an integral wrapper for protecting the cassette during shipment and manually separable therefrom to permit use of the cassette as well as providing printed material to be read by the user.

A preferred method for making the self-contained disposable record cassette and integral mailer according to the present invention includes providing a one-piece paperboard blank having fold lines, cutouts and slitted tab portions arranged and adapted to allow developing the blank into a complete housing for retaining the reels in juxtaposition for rotation therein, and in which an appendage of the blank remains attached along a perforated line after formation of the housing to form the mailer for the cassette.

The paperboard blank is partially folded to form two side panels and at least one end panel of the housing. The reels are then inserted side by side between the side panels so that the internal drive mechanism of the reels is exposed at cutouts in one of the side panels, and the recording tape wound on one of the reels is threaded through cutouts in the end panel so that the strip of tape confronts and moves along the external surface of the end panel. The free end of the tape is then fastened to the other (empty) reel to be wound thereon during use of the cassette in a VCR.

The housing is then completed by folding the paperboard at the remaining fold lines to securely retain the reels in place separated from one another while allowing them to rotate freely when loaded into and driven by the tape recording machine. The resulting end panels of the housing are sealed together with an adhesive applied to one or both of their confronting surfaces or by use of a lightweight adhesive tape. The end panels themselves and tabs associated with them are arranged and adapted to render the structure sufficiently rigid to prevent the corners from being crushed in normal handling, and the presence of the reels within the structure affords similar desirable rigidity to the sides of the cassette.

The remaining appendage of the blank is then folded about one side panel, the exposed tape end panel, the other side panel, and sealed to the housing or upon itself by a self-sealing adhesive applied to a flap at its free end or by a sealing tape. A printed address label may then be adhesively secured to an external side surface of the mailer, and the recorded cassette is ready for mailing.

It is, therefore, another object of the present invention to provide a method for making a low-cost record cassette with an integral mailer from a one-piece paperboard blank.

SUMMARY OF THE DRAWINGS

The above and still further objects, features and attendant advantages of the present invention will become apparent from consideration of the following detailed description of the presently preferred embodiment of the invention, taken in conjunction with the accompanying drawings, in which:

FIGS. 2 and 3 are perspective views of the preferred embodiment of the cassette and appended mailer looking toward the top and bottom of the housing, respectively.

DETAILED DESCRIPTION OF THE PREFERRED EMBODIMENT

Figure 1:
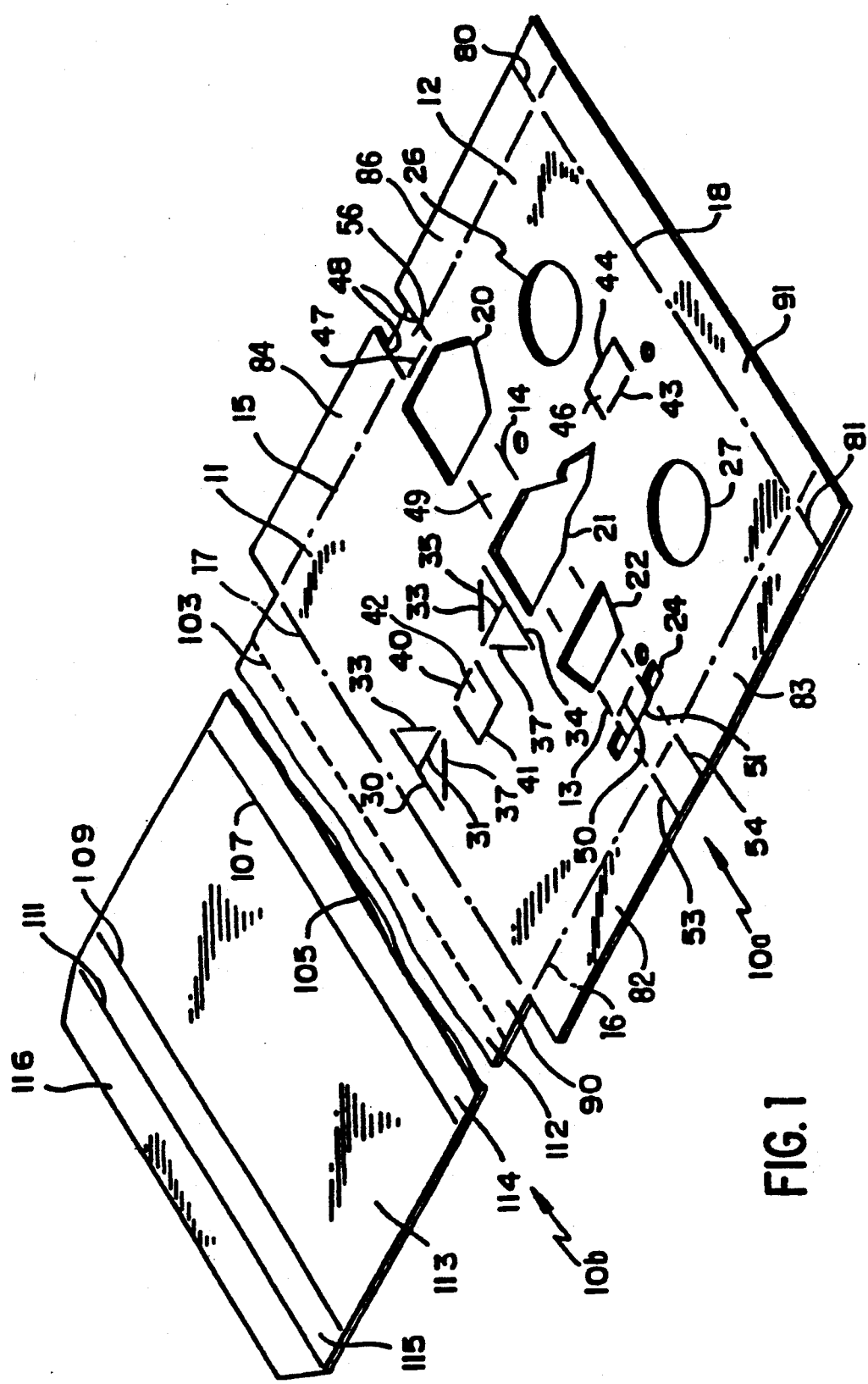
FIG. 1 if a top view of a one-piece paperboard blank to form the cassette housing and mailer according to the preferred embodiment of the invention.

Referring now to the drawings, and initially to FIG. 1, a presently preferred embodiment of a video cassette and integral mailed according to the invention is developed from a paperboard blank of one-piece construction. Preferably, the cassette housing itself is developed from the blank in the same manner as shown and described in the co-pending application, the disclosure of which is incorporated herein by reference. For convenience to the reader, portions of the description of the co-pending application pertaining to the video cassette and its housing are repeated here.

The cassette housing and integral mailer are formed from a thin flat piece of development cardboard or paperboard constituting a blank 10 which may be stamped or punched from 8 point to 30 point paperboard stock, for example. The blank is dimensioned to form a video cassette housing, of standard size depending on the format of the type of VCR in which it is to be used (e.g., VHS or Beta), and an enclosing mailer therefor. The stock may be of any desired color or may be printed with an advertising message or pattern on that part of the surface which will become the external surface of the housing, this being the top surface of the portion 10a of blank 10 as viewed in FIG. 1. In the punching process, plural cutouts, fold lines and slits are provided in the paperboard blank 10 for purposes which will be discussed presently.

Section 10a of the blank defines two side panels 11 and 12 of the housing by means of indentation lines or fold lines 13, 14, 15, 16, 17 and 18. Fold lines 13 and 14 define a first end panel 49 between the two side panels 11 and 12. Fold lines 15 and 16 define opposite ends of the side panels and also opposite end panel portions of fourth and third end panels 94, 93 of the housing. Fold lines 17 and 18 define portions of the second and final end panel 95 of the housing. All folds, including those to be mentioned in the subsequent description herein, are made downwardly as viewed in FIG. 1.

The portion 10a of the blank is also provided with a set of cutouts or punchouts some of which are configured to accommodate loading the ultimate cassette into a VCR, and others for use in conjunction with reels of recording tape to be mounted in the housing. The former include cutouts 20, 21 and 22. Cutout 24 is intended, together with associated slits and fold line to be described, to allow passage of the tape from the interior to the exterior of the housing. Cutouts 26 and 27 are provided to expose the interior of the hubs which form the drive mechanism of the reels for the recording tape.

Disposed along the central axis of substantial symmetry through the two side panels 11 and 12 are several slitted regions and associated fold lines, configured to form tabs for separating the two reels to be housed in the paperboard housing, and for preventing lateral shifting of the reels within the housing. Specifically, two triangular regions in side panel 11 include slits 30, 31 and 34, 35, and fold lines 33 and 37. Each such region, when forced downward along the fold lines, forms a pair of triangular tabs 60, 61 and 64, 65 positioned to accommodate the circular shape of the reels and to hold them against lateral shifting in the housing.

Another pair of tabs 42 and 46, rectangular in shape and ultimately used for separating the two reels, is formed by fold lines 40 and 43 along the aforementioned axis, in side panels and 12, respectively, and by slits for the other three sides of each as indicated at 41 and 44. When the folding is completed to develop the housing, these two rectangular tabs 42 and 46 will be disposed against one another and define the central axis separating the two enclosures for the reels within the housing.

The end panel formed by fold lines 13 and 14 has at one of its ends a fold line 47 which is offset inwardly of the periphery of the paperboard from the fold line 15, and slits 48 extending from fold line 47 to the periphery along fold lines 13 and 14. When the thus formed rectangular tab 56 is folded downward, and the housing is ultimately completed, a slot is formed at the offset portion to admit the recording tape at one end of this end panel. As previously mentioned, the cutout 24 near the other end of this end panel, together with an associated fold line 50 and slit 51, provide a corresponding function (to admit the tape) at the other end. For that purpose, the tab formed by the slit, fold line and cutout is folded downward to open a slot for the tape. Thus, the tape may be threaded from the interior to the exterior of the housing and back to the interior, through the slots formed at either end of this end panel. The fold line of each of the tabs at these slots provides a smooth surface on which the tape rides as it is transferred from one reel to the other during rewinding or fast forwarding of the cassette.

Slits 53 and 54 extending from fold line 16 along fold lines 13 and 14 to the periphery of section 10a of the paperboard blank 10 define a tab which, when the development is completed, serves to enhance the rigidity at a corner of the housing. A similar function is provided for two other corners of the housing by the tabs formed by slits 80 and 81 extending from fold lines 15 and 16, respectively, along fold line 18 to the periphery of section 10a. At the opposite end of section 10a, the regions corresponding to these tabs, at the intersection of fold lines 15 and 17 and of 16 and 17, are removed because when all of the folds or bends are made to complete the housing the latter two tabs are positioned at those intersections (which are then corners of the housing).

A second portion or section 10b of blank 10 is also provided with fold lines, and is employed to form the mailer for the video cassette a will be described in detail below.

The process for forming the housing for the video cassette is as follows, the completed housing being shown in top and bottom views in FIGS. 2 and 3, respectively, together with development of the integral mailer. Initially, section 10a of the blank 10 is bent or folded along parallel fold lines 13 and 14 to begin the general definition of the housing with side panels 11 and 12 and the connecting end panel containing the cutouts and tape slots. Folds are also made along fold lines 15, 16, 17, 18, 47 and 50 to generally shape the strips 82, 83, 84, 86, 99, 91 which will form the other end panels and to form the rigidizing tabs at three of the corners, and the two tape slots at opposite ends of the connecting end panel. The pair of separator tabs 42 and 46 generally disposed in the center of the side panels are then folded inwardly of the housing at fold lines 40 and 43.

A pair of reels 85 and 87 (shown in phantom in FIG. 2), one having a recording tape 75 wound thereon, are then inserted into the space between the side panels 11 and 12 so that the reels are juxtaposed with the separator tabs 42 and 46 therebetween. The free end of the recording tape is then threaded through the slits in the connecting end panel so that the tape 75 rides against the folds 47 and 50 and associated tabs, and the external surface of the connecting end panel. To prevent drag along those surfaces as the tape is transferred from one reel to the other in rewinding and fast forwarding of the cassette, the entire external surface of the connecting end panel is coated with a low friction varnish or Teflon (DuPont Company trademark) tape, preferably before actual development of the housing is commenced. This procedure provides that surface with a lower coefficient of friction than the other exposed surfaces of the housing.

After passage of the free end of the tape through the two slots in the connecting end panel, it is fastened to the hub of the empty reel 85. Upon rotation of the empty reel during play of the cassette, the tape will be wound thereon as it unwinds from the other reel 87.

Next, the opposite ends of the side panels are fully bent along fold lines 17 and 18 parallel to the two fold lines 13 and 14, to form strips 90 and 91 which will abut one another to form a second end panel 95 opposite the connecting end panel. The two strips may be bonded together by use of a self sealing adhesive which is applied to one or both of the two abutting surfaces thereof after the blank 10 is stamped out, or by gluing at the time they are to be joined, or by adhesive taping after they are brought together. By closing this end panel 95, reels 85 and 87 are now partially secured in their respective enclosures within the housing.

The pair of tabs at either end of strip 91 are then folded inwardly along fold lines 15 and 16 and inserted normal to the second end panel 95. Then the third and fourth end panels 93 and 94 of the housing are formed by bending opposite ends of each of the side panels 11 and 12 inwardly along fold lines 15 and 16 on each side panel, after each of the rigidizing tabs has been tucked in at the corners of the structure. The respective pairs of abutting strips 84, 86, and 82, 83 that form those end panels may now be fastened together in the same manner as was described above for the second end panel 95. This completes the six-sided housing enclosing the pair of reels 85 and 87, to form the video cassette.

The triangular tabs 60, 61 and 64, 65 provided in side panel 11 are then bent inwardly of the housing along fold lines 33 and 34, to retain the reels in place against lateral shifting while allowing them freedom to rotate within the housing. The rectangular tabs 42 and 46 formed along fold lines 40 and 43 abut against one another in the housing and serve as retaining tabs to separate the reels to prevent them from binding against each other during rotation. One of these retaining tabs 42 forms a hole 70 (FIG. 2) in the housing along a transparent flange of a reel, to permit viewing the extent of tape remaining on that reel.

The circular cutouts 26 and 27 in side panel 12 forming the base of the housing are slightly larger than the internal slotted surface of the hole in the hubs 99 and 100 of reels 87 and 85 (FIG. 3). Hence, when the reels are mounted within the housing, the drive mechanism of the reels constituted by the slotted holes is exposed for mounting on the mating drive mechanism of the VCR when the video cassette is loaded into a VCR. The reels may be further secured in the housing by application of a low-tack adhesive to the internal surface of a side panel against which they rest, to prevent movement thereof during handling prior to use of the cassette in a VCR. Such adhesive should be of sufficiently low adherence to be ruptured upon contact by the VCR drive mechanism without thereafter causing drag on the reels.

Section 10b of blank 10 remains appended to the housing along a line of attachment 103 at strip 90 (FIG. 1). The line of attachment is itself a fold line, preferably perforated through the paperboard. Section 10b includes other fold lines 105, 107, 109 and 111 defining side panels 112 and 113, connecting end panel 114 and opposite end panel 115, and flap 116 of the mailer or protective wrapper for the cassette. The side panels and end panels of the mailer are of the same length as strip 90 (and as the side panels 11 and 12 and their interconnecting end panel of the housing), but are slightly wider than those counterparts, just sufficiently to be wrapped around them.

Section 10b may thus be folded along fold lines 103, 105, 107, 109 and 111 to encompass side panel 12, connecting (exposed tape) end panel, side panel 11, and the opposite end panel 95 formed by strips 90, 91 of the housing with its side panel 112, end panel 114, side panel 113, and end panel 115, respectively. Preferably, the underside of flap 116 is partly coated with a self-sealing adhesive, although other means such as adhesive tape may be used, to secure the mailer in place about the housing. Finally, a printed address label ma then be adhesively secured to the outside of either side panel 112, 113 of the mailer, and the video cassette is then ready for postage and mailing.

The recipient of the cassette/mailer may readily remove the mailer portion for reading of the advertising material thereon by tearing it away along the perforation line 103 to leave a relatively clean edge thereat on the cassette. The cassette may then be loaded directly into a VCR for viewing the recorded video on an associated television set.

As noted earlier herein, the preferred use of a video cassette shipped with integral mailer according to the present invention is for advertising or preview showings for distribution to demographically selected groups of prospective viewers. This is not intended as a limitation, but for such purposes the cassette would be prerecorded for playback only. It will be seen that the present invention provides a video cassette, and in particular a housing and built-in removable mailer for a video cassette, which is sufficiently economical in both materials and fabrication process to allow low-cost shipping of the cassette as well as providing printed material and to render the entire cassette disposable after a single playback of video recording thereon, if so desired although numerous additional plays may be obtained.

Although a presently preferred embodiment and process of the invention have been disclosed herein, it will be apparent to those skilled in the art to which the present invention pertains that variations and modifications of the described illustrative embodiment and process may be made without departing from the true spirit and scope of the invention. For example, the principles of the invention may be applied to record cassettes other than video cassettes, and although the term "mailer" is used in the description and claims it will be understood to be used in its broader sense of a container for the cassette, preferably for shipping but which provides an informational function as well. It is therefore intended that the invention shall be limited only by the appended claims and the rules and principles of applicable law.

What is claimed is:

1. A record cassette, comprising a blank in the form of a thin, one-piece sheet of self-supporting foldable material, including a first portion having fold line and cutouts for forming a playable cassette housing for a record medium and the transport mechanism therefor, said first portion defining a pair of spaced apart side panels joined to an end panel by a first set of fold lines, said end panel having a first set of said cutouts for passage of a recording tape adjacent thereto, said cutouts being arranged and adapted to accommodate positioning of said housing within a video cassette recorder, said end panel having a second set of said cutouts defining a pair of said cutouts being positioned in spaced apart relationship to expose at least partially a rotational drive mechanism of said record medium, and a second portion appended to said first portion and having fold lines for forming a wrapper at least partly enclosing said housing as an integral mailer therefor, said first portion and said second portion having a fold line therebetween.

2. The invention according to claim 1, wherein said fold line between said first portion and said second portion of said blank is perforated through said material.

3. The invention according to claim 1, wherein said material is paperboard, and said fold lines are indented lines in said paperboard.

4. The invention according to claim 3, wherein said fold line between said first portion and said second portion of said blank is a line of perforations through said paperboard.

5. The invention according to claim 3, wherein said second portion includes a flap at a free end of said paperboard for sealing said mailer about said housing.

6. The invention according to claim 5, wherein the underside of said flap is coated with an adhesive sealer.

7. A video cassette for rotatably mounting a pair of reels for a recording tape in juxtaposition to allow transfer of the tap from one reel to the other as they are rotated in unison when the cassette is operating in a video cassette recorder (VCR), comprising a single flat cardboard blank having plural cutouts and fold lines for formation into a self-contained housing for said reels accommodating said rotatable mounting thereof, for loading directly into the VCR, said single flat piece of said cardboard defining a pair of spaced apart side panels joined to an end panel by a first set of fold lines, said end panel having a first set of said cutouts for passage of said recording tape adjacent thereto; and a second set of said cutouts defining a pair of said cutouts being spaced apart in one side of said housing to expose the respective rotational driving mechanism of said pair of reels when rotatably mounted in juxtaposition in said housing, for mating with the driving mechanism of the VCR when the cassette is loaded therein, and said blank further having an appendage to said housing having fold lines to enclose said housing therein, whereby to provide an integral mailer for said cassette.

8. The invention according to claim 7, wherein said appendage is attached to said housing along an easy-tear fold line to permit removal of said mailer for use of said cassette.

9. The invention according to claim 8, wherein said appendage has a free end remote from the line of attachment thereof to said housing, said free end including a flap and an adhesive overlying the inner surface of said slap for sealing said mailer about said cassette.

10. A playable cassette housing for a record medium and the transport mechanism therefor, having an integral protective wrapper for the cassette, comprising a one-piece flat paperboard blank having first and second sections with a line of attachment therebetween; said first section having indentation lines for folding thereof into said housing with a pair of generally parallel, spaced apart, planar side panels and an end panel between said side panels and extending normal thereto, and having strips foldable along others of said indentation lines to form three more end panels extending normal to said side panels to enclose said record medium and transport mechanism within said housing and maintain said side panels parallel to each other, said first section of said blank further having a pair of cutouts to form openings in one of said end panels formed through opposing ends thereof for movement of said record medium therethrough during play of said record medium; said second section having indentation lines and dimensions for folding snugly about said housing to form said integral protective wrapper.

11. The invention according to claim 10, further inducing means for securing said wrapper about said housing.

12. The invention according to claim 10, wherein said second section of said blank is attached to said first section at the end panel opposite said end panel having openings therein.

13. The invention according to claim 10, wherein said line of attachment between said first and second sections is a readily severable fold line for removal of said wrapper when said cassette is to be used.

14. A process for producing a video cassette with an integral mailer, comprising the steps of forming a paperboard blank of one-piece construction, with predetermined fold lines, cutouts and slitted portions, bending the blank along two parallel fold lines to form side panels in generally parallel planes spaced apart by an end panel formed between said parallel lines, folding in a pair of separator tabs generally disposed in the center of the side panels for contacting a pair of reels at a peripheral edge thereof, inserting said pair of reels, one having a recorded tape wound thereon, into the space between said parallel side panels so that the reels are juxtaposed with the separator tabs therebetween, threading a free end of the recorded tape through openings in said end panel so that the tap rides against the external surface of the end panel and fastening the free end of the tape to the hub of the empty reel so that upon rotation of said empty reel the tap will be wound thereon as it unwinds from the other reel, bending the free ends of said side panels along fold lines parallel to said first two fold lines to form a second end panel opposite the first end panel, bending a pair of tabs at either side of one of said free ends of said side panels along fold lines therefor and inserting said tabs normal to said second end panel, bending opposite ends of said side panels inwardly normal thereto along fold lines perpendicular to the first mentioned fold lines to form third and fourth end panels normal to said side panels and said first and second end panels, whereby to form a six-sided housing enclosing said pair of reels, bending triangular tabs slitted in one of said side panels inwardly of said housing along fold lines at an angle to the first mentioned fold lines to retain the reels in place while allowing them freedom to rotate within said housing, adhesively securing together the pairs of ends which form said second, third and fourth end panels, respectively, and folding an extended portion of said blank attached to said second panel about the two side panels and the first end panel to form said integral mailer for said cassette.

15. The process according to claim 14, further including the step of perforating the line of attachment between the extended portion of said blank and said second panel to permit said mailer to be torn cleanly away from said housing when the cassette is to be used.

16. The process according to claim 14, further including the step of applying an adhesive material to surface of the free end of said extended portion of said blank to allow the mailer to be secured about the cassette.

17. A method for making a self-contained disposable cassette for recording tape adapted to be wound and unwound on a pair of reels, and an integral wrapper for shipping said cassette, comprising forming a thin, one-piece blank of self-supporting material with one section having fold lines, cutouts and slitted tab portions arranged and adapted to allow folding said blank into a complete housing for retaining said reels in juxtaposition for rotation therein, and another section having fold lines arranged and adapted to allow folding thereof about said housing as said wrapper, partially folding said blank to form two side panels and an end panel interconnecting said side panels of said housing, inserting the reels side by side between the side panels so that the internal drive mechanism of the reels is exposed at a first set of cutouts in one of the side panels, bending tabs slitted in one of said side panels inwardly of said housing along fold lines to retain said reels in place while allowing them freedom to rotate in said housing, and threading the recording tape wound on one of the reels through a second set of cutouts in said interconnecting end panel so that the tap confronts and moves along the external surface of the end panel, and fastening the free end of the tape to the other reel for winding thereon during use of the cassette in a tape playing machine, completing the folding of said one section of the blank to close the housing and securely retain said reels in place therein separated from one another while allowing them to rotate freely when the cassette is loaded into and driven by the tape playing machine, and completing the folding of said another section of the blank to encompass the housing.

18. A record cassette, comprising a substantially flat, one-piece blank of self-supporting manually bendable material, including a first portion adapted to be bent into the form of an enclosure for a record medium and the transport mechanism therefor; said first portion including means for mounting said transport mechanism in said housing to permit controlled movement of said record medium therein, said means for mounting said transport mechanism including a plurality of tabs formed on said first portion being bent inwardly of said enclosure for positional placement adjacent said transport mechanism, and a second portion connected to said first portion and adapted to be bent about said enclosure after the formation thereof as an integral mailer for the cassette.

19. The invention according to claim 18, wherein the blank includes means for removing said second portion from said first portion through the exertion of ordinary manual force.

20. The invention according to claim 18, wherein said material is paperboard.

21. The invention according to claim 20, wherein the blank includes a liner of perforations through said paperboard between said first portion and said second portion to permit ready separation of one from the other.

22. The invention according to claim 18, wherein said second portion includes a flap for sealing said mailer about said enclosure.

23. The invention according to claim 22, wherein the underside of said flap is coated with adhesive material.

24. A cassette for a reel-to-reel recording tape, comprising a one-piece blank of self-supporting sheet material adapted to be formed into a multi-sided housing for the reels of said recording tape, said blank including means for retaining the reels of non-interfering rotation thereof on parallel axes during recording and playback of the tape, said means for retaining the reels including a plurality of tabs formed on a surface of said housing and adapted to be bent internal said housing for positioning adjacent a peripheral edge of the reels, said blank including an appendage arranged and adapted to at least partially encompass the housing as an integral protective wrapper for the cassette.

25. The invention of claim 24 wherein said appendage is manually separable from said housing.

26. The invention of claim 24 wherein said material is paperboard.

27. The invention of claim 24 wherein said appendage includes means for sealing thereof to said housing.

28. A process for producing a video cassette with an integral mailer, comprising the steps of constructing a substantially flat relatively thin one-piece blank of self-supporting manually bendable material with prearranged cutouts and tabs and a line of separation therein, bending a portion of the blank to form a multi-sided enclosure with at least two of the sides substantially parallel to each other, inserting at least two of said tabs internal said enclosure adjacent a peripheral edge of a pair of reels within said enclosure for positionally locating said reels within said enclosure, sealing the enclosure to prevent return thereof toward the original shape of the blank, and bending another portion of the blank, connected to the first-named portion along said line of separation, to at least partially encompass the enclosure and thereafter sealing the two portions together.

* * * * *